(12) United States Patent
Cansler et al.

(10) Patent No.: US 9,800,949 B2
(45) Date of Patent: *Oct. 24, 2017

(54) SYSTEM AND METHOD FOR PRESENTING ADVERTISING DATA DURING TRICK PLAY COMMAND EXECUTION

(71) Applicant: AT&T INTELLECTUAL PROPERTY I, L.P., Atlanta, GA (US)

(72) Inventors: James L. Cansler, Cedar Park, TX (US); Charles Scott, Austin, TX (US); Scott White, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 470 days.

This patent is subject to a terminal disclaimer.

(21) Appl. No.: 13/909,634

(22) Filed: Jun. 4, 2013

(65) Prior Publication Data

US 2013/0340001 A1 Dec. 19, 2013

Related U.S. Application Data

(63) Continuation of application No. 12/040,261, filed on Feb. 29, 2008, now Pat. No. 8,479,229.

(51) Int. Cl.
| | |
|---|---|
| *G06Q 30/00* | (2012.01) |
| *H04N 21/81* | (2011.01) |
| *H04N 7/173* | (2011.01) |
| *H04N 21/234* | (2011.01) |
| *H04N 21/2387* | (2011.01) |

(Continued)

(52) U.S. Cl.
CPC ....... *H04N 21/812* (2013.01); *H04N 7/17318* (2013.01); *H04N 21/2387* (2013.01); *H04N 21/23424* (2013.01); *H04N 21/44016* (2013.01)

(58) Field of Classification Search
None
See application file for complete search history.

(56) References Cited

U.S. PATENT DOCUMENTS

| | | |
|---|---|---|
| 5,371,551 A | 12/1994 | Logan et al. |
| 5,911,029 A | 6/1999 | Sakaguchi et al. |

(Continued)

FOREIGN PATENT DOCUMENTS

| | | |
|---|---|---|
| EP | 2070330 A2 * | 6/2009 |
| WO | WO 02/082374 A2 * | 10/2002 |

OTHER PUBLICATIONS

WO 2002/082374 A2 . Alternative advertising in pre-recorded media.*

(Continued)

*Primary Examiner* — Victoria Vanderhorst
(74) *Attorney, Agent, or Firm* — Guntin & Gust, PLC; Joseph Hrutka

(57) ABSTRACT

A computer readable medium is disclosed containing instructions that when executed by a computer perform a method for presenting advertising data, the method including but not limited to placing scene start marker data in video data stream at a scene start data; receiving end user trick play command data during presentation of the video data stream at the end user device; and moving to the scene start marker data in the video data in response to the end user trick play command data. A system is disclosed for executing the method. A data structure is disclosed for containing data used by the system and method.

15 Claims, 11 Drawing Sheets

(51) Int. Cl.
*H04N 21/44* (2011.01)
*G05B 19/418* (2006.01)

(56) References Cited

U.S. PATENT DOCUMENTS

| | | | |
|---|---|---|---|
| 6,378,132 B1* | 4/2002 | Grandin | G06F 17/30017 |
| | | | 348/722 |
| 6,919,892 B1 | 7/2005 | Cheiky et al. | |
| 7,120,351 B2 | 10/2006 | Engle et al. | |
| 2005/0058426 A1* | 3/2005 | Malcolm | G11B 27/034 |
| | | | 386/281 |
| 2005/0097599 A1 | 5/2005 | Plotnick et al. | |
| 2007/0159522 A1 | 7/2007 | Neven et al. | |
| 2007/0162951 A1* | 7/2007 | Rashkovskiy | H04H 20/106 |
| | | | 725/134 |
| 2008/0074424 A1 | 3/2008 | Carignano et al. | |
| 2008/0172293 A1* | 7/2008 | Raskin | G06Q 10/04 |
| | | | 705/14.1 |
| 2008/0235087 A1* | 9/2008 | Amento | G06Q 30/02 |
| | | | 705/14.54 |

OTHER PUBLICATIONS

EP 2070330 A2 . An approach for associating advertising supplemental information with video programming.*

V-Active Hyperlinks Digital Video to a New Dimension, PR Newswire, p331NYM034, Mar. 31, 1997.

* cited by examiner

SYSTEM AND METHOD FOR PRESENTING ADVERTISING DATA DURING TRICK PLAY COMMAND EXECUTION

RELATED APPLICATIONS

The application is a continuation of and claims priority from U.S. patent application Ser. No. 12/040,261 filed on Feb. 2, 2008 by Cansler et al. entitled A System and Method for Presenting Advertising Data During Trick Play Command Execution, which is hereby incorporated by reference in its entirety.

FIELD OF THE DISCLOSURE

The present disclosure relates to the field of trick-play command execution during presentation of video data.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television (TV), special or pay-per-view programming, video on demand (VOD), and other content choices available to subscribers. Television advertisers now target advertisements based on regions in which the television signal is delivered. For example, viewers in a New York state region will receive different advertising data than viewers in a Texas state region.

DETAILED DESCRIPTION

Figure 1:
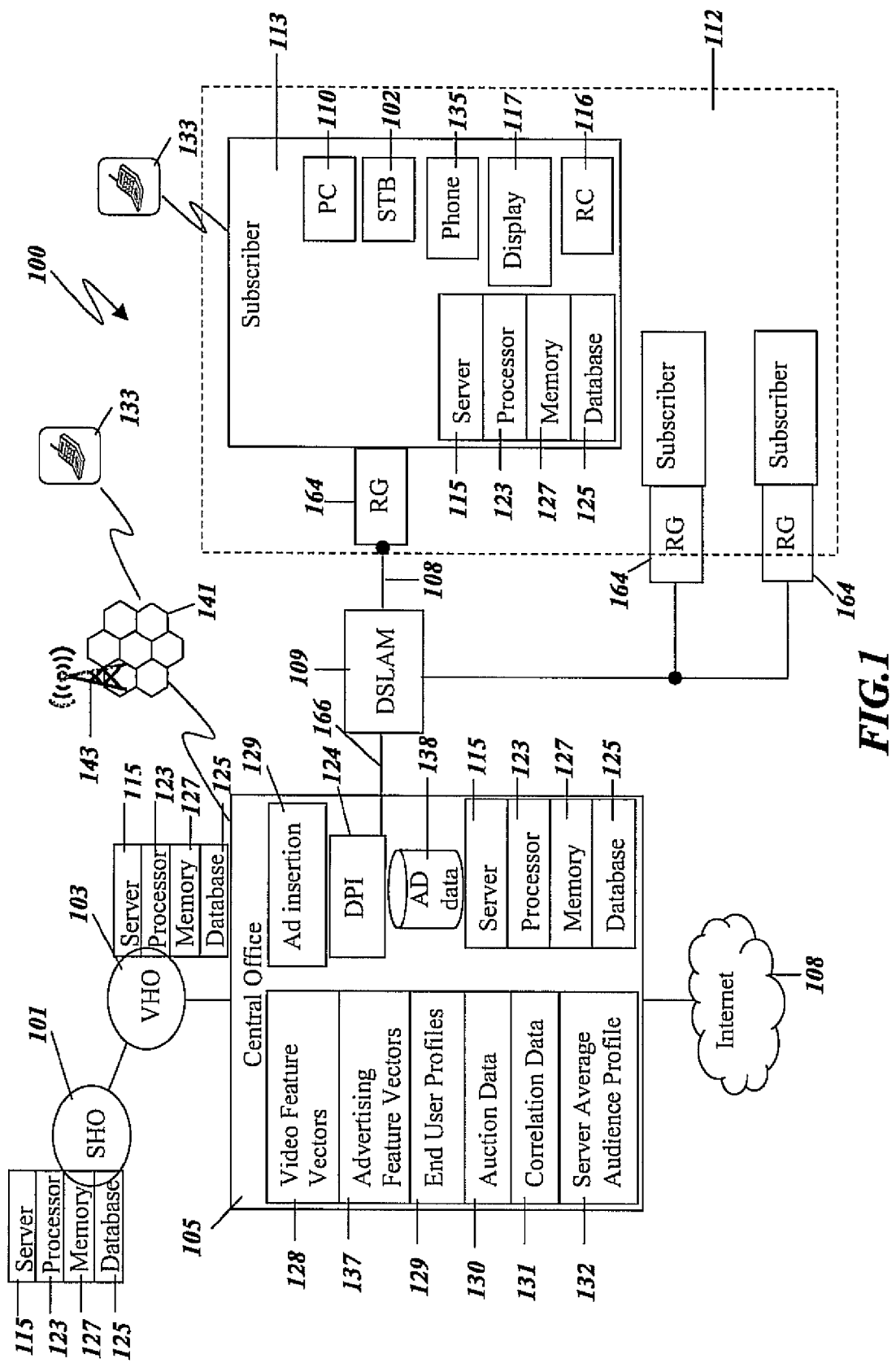
FIG. 1 depicts an illustrative embodiment of a system for presenting advertising data during trick play command execution.

An illustrative embodiment of a system and method are disclosed in which a video presentation device, such as a set top box (STB) or a digital video recorder (DVR) execute DVR skip functions, which would normally skip forward or backward by a fixed amount, but instead skip to markers or key frames inserted into video data presented at an end user device. In a particular embodiment, the markers are placed in video data at the beginning and ending of scenes in video data. The scenes are automatically detected in the video data. In another embodiment the markers can be supplied by the content provider within the video stream or its associated sub streams or Meta data. This function would only take place when such data is available; otherwise, skip functionality reverts to standard fixed intervals. Other embodiments are also disclosed. In another embodiment, the content provider 'tags' the beginning and ending points of key scenes by establishing key frames, which are inserted in video data before broadcast from the content provider for a pre-recorded program. In another embodiment, the makers are inserted into the video data in real-time or near-real-time (for example, a live event broadcast of video data). These key frames or makers are broadcast to end user video presentation devices, such as STB and DVRs as either part of the video stream or its sub channels (which carry alternate audio tracks, closed-captioning or other data).

When a DVR user uses a skip forward or skip backward function (herein also referred to as a "trick play" command), either in a live or time-shifted context, the DVR would first look for nearby key frames (also referred to herein as "markers) within a threshold (e.g., if the user is skipping backward, the DVR would look for key frames within the previous 60 seconds). When a marker such as a scene marker is found in the video data, the DVR would forego a normal skipping interval (e.g., skip backward 15 seconds) and instead skip forward or backwards to the next key frame in the forward or backward direction. If no key frame or marker is found, the DVR skips its normal interval (e.g., 15 seconds).

In another embodiment, a program or content provider 'tags' (places markers video data at scene start and scene end) scenes which it deems likely to generate user skipping behavior—e.g., a significant line of dialog, a key plot point, an action sequence, etc.—for convenient access by the user. While the user is watching the program, they may find a given scene remarkable and wish to see it again. The user would perform the natural action—hitting the 'skip backward' button. Instead of skipping backward a fixed interval, the playback would skip backward to the first key frame encountered in the reverse direction, denoting the beginning of the sequence. The user may or may not be aware that the 'skip' action hasn't moved a fixed amount per standard trick play execution instead of—to the user, it simply appears to the end user that the DVR happens to be very good at predicting what the end user wishes to see, enhancing the video presentation experience.

This 'targeted trick-play' functionality is sponsored with advertising data presented during trick play command execution. For example, while performing a skip-back function and being taken to a key frame, a particular illustrative embodiment presents a small, watermarked advertising data time saying "This instant replay brought to you by Advertiser X" (or similar). The display advertising data item presented may be audio, image or video data. A particular illustrative embodiment benefits the user by anticipating the intent of their trick-play actions and delivering the portion of the DVR recording likely to interest the user, and by doing so in response to a common interaction method (i.e., the user doesn't need to learn a new action to benefit from this invention). The service provider benefits by creation of an additional advertising venue.

In a particular illustrative embodiment an end user executes a trick-play command (including, for example, but not limited to, fast-forward, rewind, skip forward, and skip back), with the trick-play operation taking the same amount of time. For example, if it normally takes three seconds to fast-forward over an advertising data item (referred to herein as "trick-play duration"), and then this fast-forward operation still takes three seconds. However, benefiting the advertiser, network and service provider, those three seconds are used presenting a sponsored advertising data item. The result is an advertising data item (commercial) skipping system and method that satisfies the user by occupying the same amount of time as a normal trick-play operation, while giving advertisers sponsorship opportunities in place of commercials that are skipped giving the sponsor at least some exposure to the end user.

In another particular embodiment, a computer readable medium is disclosed containing instructions that when executed by a computer perform a method for presenting advertising data, the method includes but is not limited to receiving a video data stream at an end user device; receiving a video data stream at an end user device; recognizing a pattern in the video data stream indicating a particular arrangement of objects in the video data stream as scene start data; placing scene start marker data in the video data stream at the scene start data; receiving end user trick play command data during presentation of the video data stream at the end user device; and moving to the scene start marker data in the video data in response to the end user trick play command data.

In another embodiment of the medium, the method further includes but is not limited to presenting trick play sponsor data during trick play command data execution. In another embodiment of the medium, the method further includes but is not limited to generating scene characterization data for scene in the video data stream between the scene start and a scene end and selecting a trick play sponsor from a correlation between scene characterization data for the selected scene and the sponsor. In another embodiment of the medium, in the method the trick play sponsor data further comprises visual presentation data. In another embodiment of the medium, in the method the trick play sponsor data further comprises audio presentation data. In another embodiment of the medium, in the method the data indicating the arrangement of objects further includes but is not limited to data indicating a sports formation selected from the group consisting of a football line of scrimmage, a baseball batter stepping into a batter's box to begin a turn at bat and a golfer addressing a golf ball before striking the golf ball. In another embodiment, recognizing further includes but is not limited to sensing movement of a sports object data indicating movement of a sports object, for example, including but not limited movement of data indicating a moving golf ball, baseball and formation of football players in two parallel lines. In another embodiment of the medium, in the method the scene further includes but is not limited to a plurality of scenes data bridged together.

In another embodiment a system for presenting advertising data is disclosed, the system including but not limited to a processor in data communication with a computer readable medium and a computer program embedded in the computer readable medium, the computer program includes but is not limited to instructions to receive a video data stream at an end user device, receiving a video data stream at an end user device; instructions to a pattern in the video data stream indicating a particular arrangement of objects in the video data stream as scene start data; instructions to place scene start marker data in the video data stream at the scene start data; instructions to receive end user trick play command data during presentation of the video data stream at the end user device; and instructions to move to the scene start marker data in the video data in response to the end user trick play command data.

In another embodiment of the system, the computer program further includes but is not limited to instructions to present trick play sponsor data during trick play command data execution. In another embodiment of the system, the computer program further includes but is not limited to instructions to generate scene characterization data for scene in the video data stream between the scene start and scene end and instructions to select a trick play sponsor from a correlation between scene characterization data for the selected scene and the sponsor. In another embodiment of the system, in the computer program the trick play sponsor data further comprises visual presentation data. In another embodiment of the system, in the computer program the trick play sponsor data further comprises audio presentation data. In another embodiment of the system, in the computer program the instructions to recognize data indicating a particular arrangement of objects in the video data stream further include but are not limited to instructions to sensing movement of sports object data within the arrangement of objects. In another embodiment, the sports object data indicate an object including but not limited to a baseball, a golf ball and a formation of football players in two parallel lines. In another embodiment of the system, in the computer program the data indicating the arrangement of objects further comprise data indicating a sports formation selected from the group consisting of a football line of scrimmage, a baseball batter stepping into a batter's box to begin a turn at bat and a golfer addressing a golf ball before striking the golf ball. In another embodiment of the system, in the computer program the scene data further comprises a plurality of scenes data bridged together.

In another particular embodiment, a method is disclosed for selecting advertising data, including but not limited to detecting a plurality of different scenes in a video data stream; correlating each of the scenes with a plurality of advertising data classes; and selecting advertising data for one of the scenes based on the correlation. In another particular embodiment of the method, the method further includes classifying the scenes into scene classes, wherein correlating further comprises correlating the scene classes with the advertising data classes. In another particular embodiment of the method, the method further including auctioning an advertising spot to obtain an auction price for one of the scenes based on the correlation, plus demographics and end user devices for current end users to which the advertising will be made available. In another particular embodiment of the method, one of the scenes further comprises a plurality of scenes bridged together into a bridged scene, wherein the bridged scenes share a common topic based on data in the bridged scenes selected from the group consisting of image, audio and text data.

In another particular embodiment of the method, the demographics further comprises an average demographic profile for a current end user device receiving the video data served by an internet protocol television (IPTV) server. In another particular embodiment of the method, the method further includes seeding the scene classes with initial key words using Meta data for the video data; seeding the advertising data classes with initial key words using Meta data for the advertising data; and determining a classification for the scene and advertising data using machine learning. In another particular embodiment of the method, correlating further comprises correlating feature vectors for the scenes with feature vectors for the advertising data.

In another particular embodiment of the method, selecting further comprises selecting an advertising class based on a probability of a video scene class matching an advertising data class. In another particular embodiment of the method, selecting further comprises selecting highest probable revenue advertising data classification category based on an auction value for advertising data class for the advertising spot and an end user preference probability for each of the advertising data classes. In another particular embodiment of the method, the feature vectors further comprise Meta data describing the data, image data, audio data, and text data.

In another particular embodiment a system for selecting advertising data is disclosed, the system including but not limited to a processor in data communication with a computer readable medium; a computer program embedded in the computer readable medium, the computer program including but not limited to instructions to detect a plurality of different scenes in a video data stream, instructions to correlate each of the scenes with a plurality of advertising data classes and instructions to select advertising data for one of the scenes based on the correlation. In another particular embodiment of the system, the computer program further includes instructions to classify the scenes into scene classes, wherein correlating further comprises correlating the scene classes with the advertising data classes.

In another particular embodiment of the system, the computer program further comprises instructions to auction an advertising spot to obtain an auction price for one of the scenes based on the correlation, plus demographics and end user devices for current end users to which the advertising will be made available. In another particular embodiment of the system, one of the scenes further comprises a plurality of scenes bridged together into a bridged scene, wherein the bridged scenes share a common topic based on data in the bridged scenes selected from the group consisting of image, audio and text data. In another particular embodiment of the system, the demographics further comprise an average demographic profile for current end users receiving the video data served by an internet protocol television (IPTV) server.

In another particular embodiment of the system, the instructions to classify further comprise instructions to seed the scene classes with initial key words using Meta data for the video data, instructions to seed the advertising data classes with initial key words using meta data for the advertising data and instructions to determine a classification for the scene and advertising data using machine learning. In another particular embodiment of the system, correlating further comprises correlating feature vectors for the scenes with feature vectors for the advertising data. In another particular embodiment of the system, the instructions to select further comprise instructions to select an advertising class based on a probability of a video scene class matching an advertising data class. In another particular embodiment of the system, the instructions to select further comprise selecting highest probable revenue advertising data classification category based on an auction value for advertising data class for the advertising spot and an end user preference probability for each of the advertising data classes.

In another embodiment a computer readable medium is disclosed containing instructions that when executed by a computer perform a method for selecting advertising data the computer program including but not limited to instructions to detect a plurality of different scenes in a video data stream, instructions to correlate each of the scenes with a plurality of advertising data classes and instructions to select advertising data for one of the scenes based on the correlation. In another embodiment a data structure embedded in a computer readable medium is disclosed, the data structure including but not limited to a first field for containing data indicative of a video segment classification; a second field for containing data indicative of an advertising data classification; and a third field for containing data indicative of a probability of the video segment classification matching the advertising data classification. In another embodiment a system is disclosed for receiving advertising data, the system including but not limited to a processor in data communication with a computer readable medium; a computer program embedded in the computer readable medium, the computer program including but not limited to instructions to receive advertising data available indicators for a plurality of different scenes in a video data stream.

In another embodiment, a computer readable medium is disclosed containing a data structure embedded in the computer readable medium for containing data, the data structure including but not limited to a first data structure field for containing data indicating scene identifier data for a scene detected in a video data stream, a second data structure field for containing data indicating scene start maker data for a formation recognized in the scene identified in the scene identifier data and a third data structure field for containing trick play command data for containing data indicating a sponsor for advertising data for presentation during execution of trick play command data. In another embodiment, the data structure further includes but is not limited to a fourth data structure field for containing data indicative of trick play command data for execution in skipping to the scene during execution of the trick play command data.

Turning now to FIG. 1, FIG. 1 depicts an illustrative embodiment of a system for automatically selecting advertising for a subscriber based on content of video segments. The video segments are provided via a triple play internet protocol television (IPTV) system (providing IPTV, vice over internet protocol (VoIP) and Internet). The triple play IPTV system provides IPTV video, high speed internet video and other data from high speed internet and VoIP data and video. The video segments can be video data including but not limited to television programming, movies, video on demand in which Meta data describing the video data may be supplied or video data without associated Meta data such as user generated video data.

In an illustrative embodiment, the IPTV system builds subscriber profiles for IPTV subscribers by aggregating and correlating subscriber related statistics and subscriber activity data along with other subscriber data and demographic information such as gender, age, income, languages spoken, areas of interest, etc. Some of the subscriber profile data can be volunteered by an IPTV subscriber during an IPTV registration process. In another particular embodiment the subscriber profile data further contains data for which a subscriber has opted in for monitoring and use by an IPTV triple play system for the purposes of automatically receiving targeted advertising data. Subscriber preferences for particular advertising classes of current viewers can be estimated from data included in the subscriber profile, including but not limited to device type, subscriber type, and device state based on the subscriber activity data.

Based on subscribers' interests, background, and subscriber profiling results, demographics and subscriber activity data one of the following targeted advertising data delivery methods and systems described herein or an equivalent thereof can be utilized to estimate an auction price for selecting targeted advertising. Targeted advertising is automatically selected and made available to personalized advertising data and television commercial delivery to IPTV television displays, portable subscriber data and messaging devices such as mobile or cell phones and video, website banners and pop up displays on a PC or mobile Laptop computer.

As shown in FIG. 1, the IPTV system 100 delivers video content and targeted advertising to subscriber house holds 113 and associated end user devices (referred to herein as subscriber devices) which may be inside or outside of the household. Television advertising data is inserted or marked as available by the advertising server 138. In the IPTV system, IPTV video data are first broadcast in an internet protocol (IP) from a server at a super hub office (SHO) 101 to a regional or local IPTV video hub office (VHO) server 103, to a central office (CO) server 105. The IPTV system 100 includes a hierarchically arranged network of servers wherein the SHO transmits video and advertising data to a video hub office (VHO) 103 and the VHO transmits to an IPTV server location close to a subscriber, such as a CO server 105. In another particular embodiment, each of the SHO, VHO, and CO is interconnected with an IPTV transport 166. The IPTV transport 166 may consist of high speed fiber optic cables interconnected with routers for transmission of internet protocol data. The IPTV servers also provide data communication for data and video associated with Internet and VoIP services to subscribers.

Actively viewed IPTV channels are sent in an Internet protocol (IP) data multicast group to access nodes such as digital subscriber line access multiplexers (DSLAMS) 109. A multicast for a particular IPTV channel is joined over a DSL line 108 by the set-top boxes (STBs) at IPTV subscriber homes from the DSLAM. Each SHO, VHO, CO and STB includes a server 115, processor 123, a memory 127, and a database 125. The processor 123 further includes a network interface. The network interface functions to send and receive data over the IPTV transport 166 and DSL line 108. The CO server delivers IPTV, Internet and VoIP video content to the subscriber via the DSLAM. The television Internet and VoIP content can be delivered via multicast and unicast television advertising data via unicast or multicast depending on a single subscriber or a targeted television advertising group of end user client subscriber devices to which the advertising data is directed.

In another particular embodiment, subscriber devices, including but not limited to, wire line phones 135, portable phones 133, personal computers (PC) 110 and STB 102 communicate with the communication system, i.e., IPTV system through residential gateway (RG) 164 and high speed communication lines 108 and 166. In another particular embodiment, DPI device 124 inspects VoIP, Internet and IPTV video data, data, commands and Meta data transmitted between the subscriber devices and the IPTV system servers. In another illustrative embodiment subscriber activity data are monitored and collected whether or not the subscriber's devices are in the household 113 or traveling as mobile devices outside of the household. When outside of the household, subscriber mobile device activity data and transactions data are monitored by communication network (e.g. IPTV) servers which associate the subscriber activity factors data with particular subscribers. In another particular embodiment, subscriber activity data such as communication and purchase transactions are inspected by DPI devices located in a communication system, e.g., IPTV system servers. These communication system servers route the subscriber activity data to an IPTV server such as the CO in which the subscriber activity data for a subscriber are stored for processing. While an IPTV system has been used as an example in the illustrative embodiment, the disclosure is not meant to be limited to IPTV as other communication systems such as cable television or other digital and analog data delivery systems can be used in other embodiments.

In another particular embodiment, the end user subscriber devices include but are not limited to a client user computer, a personal computer (PC), a tablet PC, a set-top box (STB), a Personal Digital Assistant (PDA), a cellular telephone, a mobile device, a palm computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP video and data, Internet video and data and IPTV video and data, commands and Meta data between the subscriber end user devices and the IPTV system servers and the Internet. In another illustrative subscriber activity data are monitored and collected whether or not the subscriber devices are in the household 113 or the devices are mobile outside of the household. When outside of the household, subscriber mobile device data are monitored by communication system (e.g. IPTV) servers which associate the subscriber activity data with each particular subscriber's device. In another particular embodiment, subscriber activity data such as IPTV and Internet video selections, and communication and purchase transactions are inspected by DPI devices located in a communication system, e.g., IPTV system servers. These communication system servers route the subscriber activity data to a CO in which the subscriber activity data for a subscriber are stored for processing.

As shown in FIG. 1 advertising sub groups 112 (including but not limited to a group of subscriber house holds 113) receive multicast advertising data in video data stream from CO server 115 and DSLAM 109 at STB 102. Individual households 113 receive advertising data at set top box 102 or one of the other subscriber devices. More than one STB 102 can be located in an individual household 113 and each individual STB can receive a separate multicast or unicast advertising stream on IPTV transport 166. In another particular illustrative embodiment separate and unique advertising data are sent to each set top box (STB) 102 tailored to target the particular subscriber watching television at that particular STB. Each STB 102 has an associated remote control (RC) 116 and video display 117. The subscriber via the RC selects channels for a video data viewing selection (video programs, games, movies, video on demand) and places orders for products and services over the IPTV system 100.

FIG. 1 depicts an illustrative communication system, including but not limited to a television advertising insertion system wherein television advertising data can be inserted at an IPTV server (SHO, VHO, CO) or at the end user client subscriber device, for example, an STB, mobile phone, web browser or personal computer. Advertising data can be inserted into or made available in an IPTV video stream via advertising insertion device 129 located at the IPTV CO server 105 or at one of the end user devices such as the STB 102. The IPTV servers include an advertising server 129 and an advertising database 138. The advertising data is selected by advertising selection element 129 from the advertising database 138 based on a subscriber profile and delivered by the VHO advertising server 138 to the IPTV VHO server 115. An SHO 101 distributes data to a regional VHO 103 which distributes data to local COs 105 which distribute data to a digital subscriber access line access multiplexer (DSLAM) access node to subscriber devices such as STB 102 PC 110, wire line phone 135, mobile phone 133 etc. Advertising data is also selected based on the holistic subscriber profile and sent to a mobile phone or computer associated with the subscriber. The subscriber profile is built based on a subscriber's IPTV, Internet and VoIP activity. As shown in FIG. 1, the CO creates and stores the video classes such as feature vectors 128, advertising data classes such as feature vectors 137, end user profile data 129, auction data 130, correlation data 131 and server average audience profile data 132.

Figure 2:
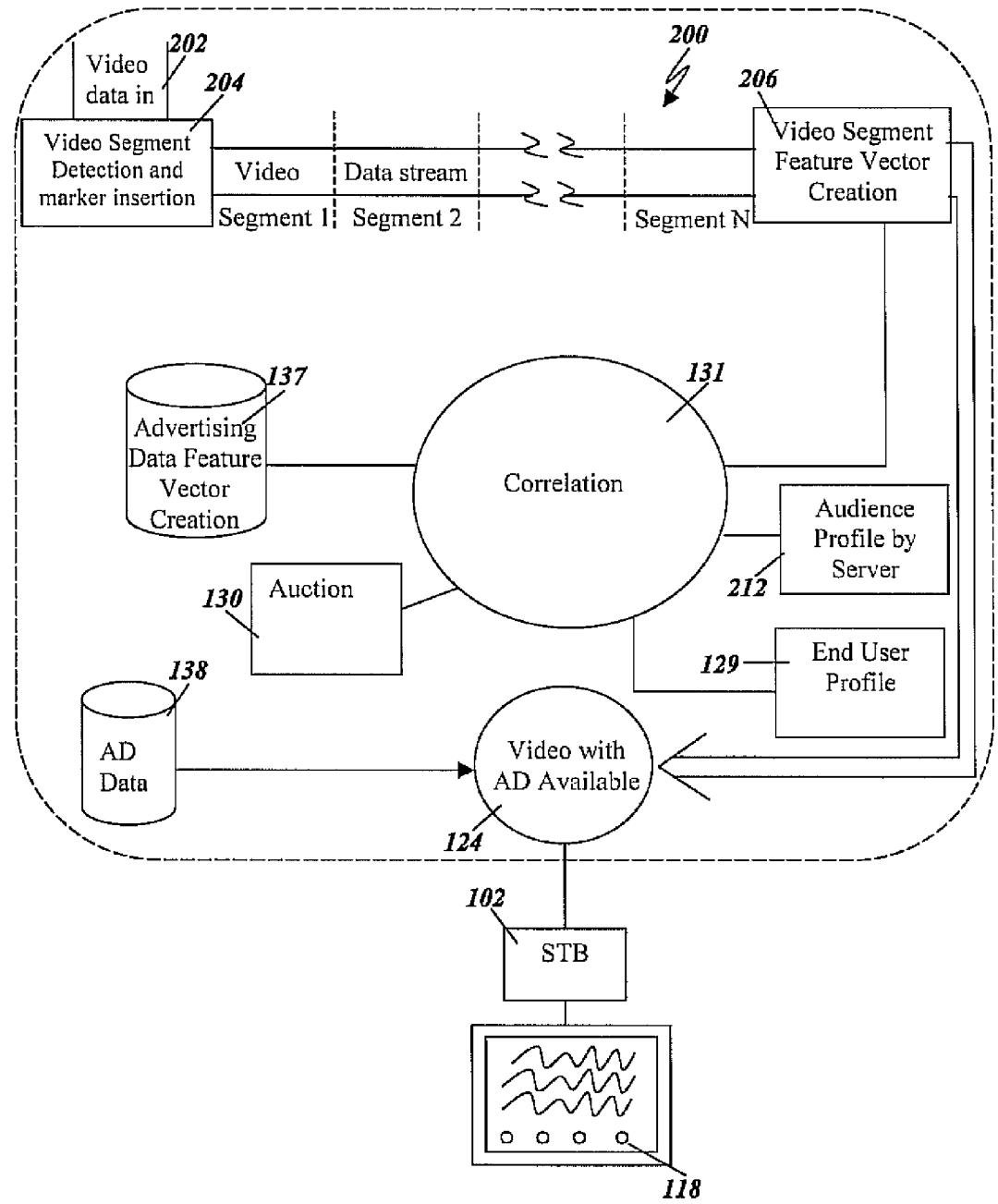
FIG. 2 depicts another more detailed illustrative embodiment of a system for presenting advertising data during trick play command execution.

Turning now to FIG. 2, in a particular illustrative embodiment, the CO 105 contains a video segment or scene detection and marker insertion device 202 which recognizes scene changes within the video data and breaks the video data into video segments 1 through N. Each video data segment or scene has a scene starting point ("scene start") and scene ending point ("scene end"). Each scene start in the video data is marked by the marker insertion device 202 by inserting marker data at the scene starting point in the video data. Each scene end in the video data is marked by the marker insertion device 202 by inserting marker data at the scene end point in the video data. Video segments 1 through N are fed to the video segment feature vector creation device 206 where a feature vector for each video segment is created. In creating feature vectors or classes for the video segments, the video segment feature vector creation device takes Meta data describing the video data, image data from the video segment, video segment audio data for the video segment, and text data in the video segment and creates a feature vector for each video segment. The feature vectors device uses linguistic understanding, pattern recognition and machine learning to develop the feature vectors. The video segment detection device and feature vector creation device are implemented by processor 123. In another embodiment, the video segment feature vector creation device is a classification device creating classification categories (also referred to herein as "classes") for each of the video segments based on Meta data describing the video data, image data from a video segment, video segment audio data for the video segment and, text data in the video segment. The video segment feature vector data or class data is then passed to the correlation device 131. The correlation device is implemented by processor 123.

The advertising data for a number of advertisements selected from the advertising database 138 is passed through the advertising data feature vector creation device 137. The advertising data feature vector creation device creates a feature vector or class for each advertisement. The advertising data feature vector creation device 137 takes Meta data describing the advertisement, image data from the advertisement, audio data from the advertisement, and text data from the advertisement to create the advertisement feature vector or advertising data classification category. The advertising data feature vectors are passed to the correlation device 131. The correlation device 131 compares feature vectors or classification categories for the video segments to feature vectors or classes for the advertising data. Advertisements are selected having the highest probability of matching any feature vector for one of the plurality of video segments advertisements based on audience profiles average for an IPTV server 212 or an individual end user profile 129. In another embodiment, several related video segments are bridged together when they share a common topic, based on common language, images or text in the video segments, to form a bridged segment or scene. The term scene is used herein synonymously with the word segment.

In another particular illustrative embodiment, the correlation device is implemented by support vector machines which process feature vectors created by machine learning. The machine learning can be unsupervised or supervised. In another embodiment, the initial classes for the advertisements are seeded with Meta data describing the advertisements. In another embodiment, the advertising classes or feature vectors, developed through supervised or unsupervised learning are correlated with the video segment to estimate a probability for each video segment matching one or more advertisements in the advertising classes. Other classification systems and correlation techniques such as neural networks can be used in other embodiments.

Based on the results of correlation techniques applied, advertisements that have a high probability of matching a particular video segment or scene are selected and placed for auction at block 130. The auction prices for advertising during a video segment or scene (also referred to herein as an advertising spot) are based on the advertising category classification, video category classification and the current audience of end user(s) to which the current advertising data would be presented. The subscriber activity data in the subscriber profile is used to assess a preference probability, that is, a particular end user's or group of end users probability of selecting a particular advertisement in a particular class or category classification. This preference probability for the end user to select a particular advertising classification is multiplied by the probability of the advertising classification category matching the video segment and the auction price to yield first probable revenue for presenting the advertisement as available to an end user. If an end user profile indicates that the end user is biased against the selected advertising class, by having a preference probability below a programmable predetermined value, for example 50%, another advertisement is selected in another class and the auction revenue multiplied by his preference probability for that advertisement in the class to calculate second probable revenue. In another embodiment, at least two advertising classes are selected and probable revenues calculated for each selected advertising class. The highest probable revenue for the end user is used to select the advertising data which is present our made available for selection to the end user. The selected advertising data is presented during trick play execution between video data markers.

Figure 3:
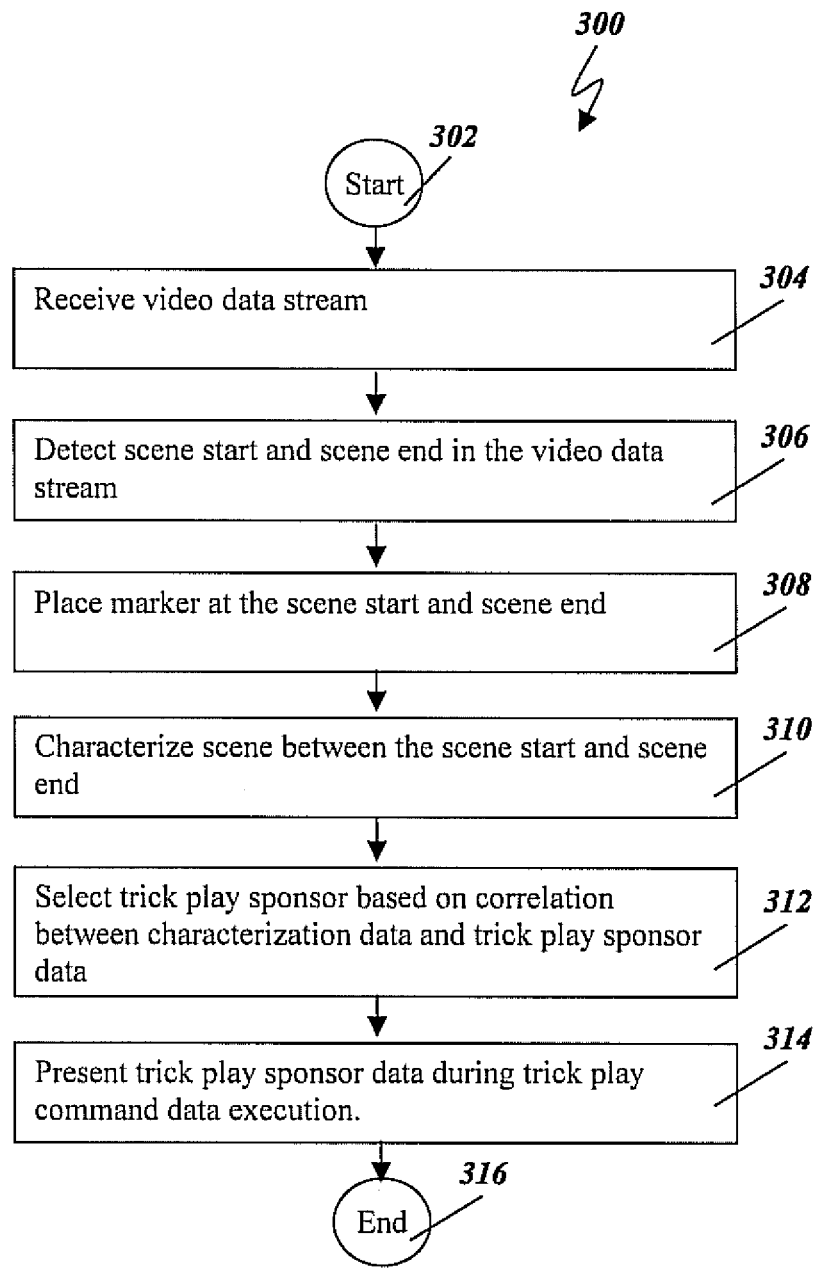
FIG. 3 depicts a flow chart of functions performed in an illustrative method for presenting advertising data during trick play command execution.

Turning now to FIG. 3, in another illustrative embodiment, a flowchart 300 of functions as shown in FIG. 3 is performed. No mandatory order of execution is meant to be implied by flow chart 300. In other embodiments, any of the functions in flow chart 300 may be executed or partially executed in any order or may be left out completely. A shown in FIG. 3, in block 304 a particular illustrative embodiment receives a video data stream from an IPTV system or another video data source such as satellite, cable TV or another analog for digital video data delivery system. In block 306 a particular illustrative embodiment further detects scene start data and scene end data in the video data stream. In block 308 a particular illustrative embodiment further places marker data at the scene start and scene end detected in the video data. In block 310 a particular illustrative embodiment further characterizes the scenes between the start and end markers, thereby generating a scene identifier, marker identifiers associated with the scene and scene characterization data for the scene as discussed herein. In block 312 a particular illustrative embodiment further selects trick play advertising data (i.e., sponsor data) based on a correlation between the scene characterization data and advertising data for the trick play sponsor. In block 314 an illustrative embodiment further presents trick play sponsor data during execution of trick command data received at an end user device.

Figure 4:
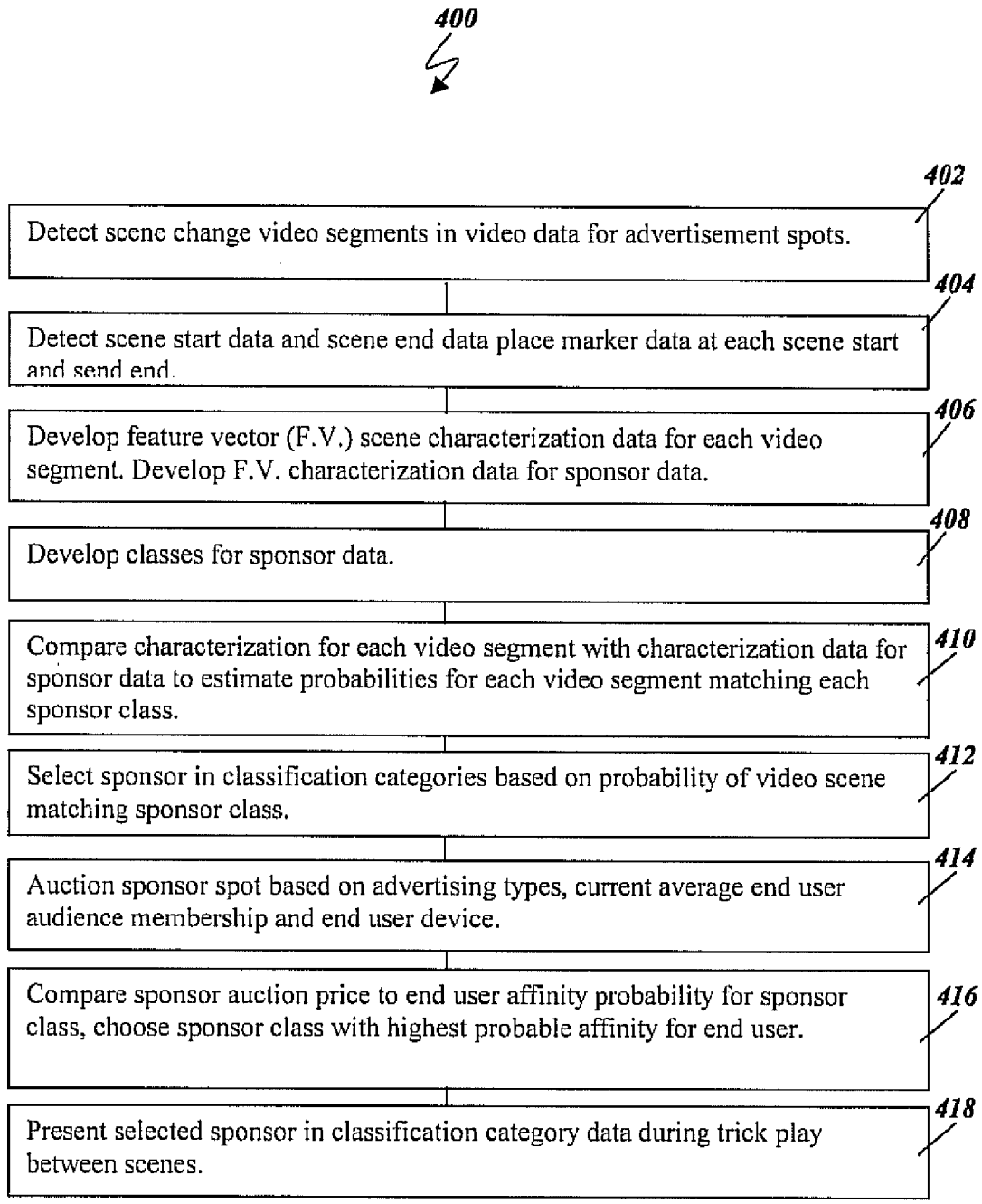
FIG. 4 depicts a flow chart of functions performed in an illustrative method for presenting advertising data during trick play command execution.

Turning now to FIG. 4, in another illustrative embodiment, a flowchart 400 of functions as shown in FIG. 4 is performed. No mandatory order of execution is meant to be implied by flow chart 400. In other embodiments, any of the functions in flow chart 400 may be executed or partially executed in any order or may be left out completely. In an illustrative embodiment of a method, in block 402 an illustrative embodiment detects scene changes or segments in the video data for locating potential advertising spots associated with trick-play command execution between different segments or scenes in the video data. Each scene or segment in the video has the potential for a different advertisement in a different advertising classification category. At block 404 a particular illustrative embodiment develops feature vectors for each of the detected video segments. At block 406 an illustrative embodiment develops feature vectors for the advertising data that might be proposed for availability in the advertising spots associated with the video segments. In block 408 an illustrative embodiment develops classes or feature victors for the advertising data which in an illustrative embodiment, the classes or feature vectors are processed by a support vector machine (SVM). The SVM compares the feature vectors for the advertising data against the video data segments to determine a probability for each video segment matching each of the advertisements associated with the feature vectors. In another embodiment, the SVM compares the feature vectors for the advertising data against feature vectors for the video data segments to determine a probability for each video segment matching each of the advertisements associated with the feature vectors. Other classification techniques and correlation functions such as neural networks may be utilized to match advertising classes with video segment classifications and end users in another embodiment.

At block 410 an illustrative embodiment further compares feature vectors for each video segment with feature vectors for advertising data to estimate probabilities for each video segment matching each advertising classification category or feature vector. At block 412 an illustrative embodiment selects advertisements in the classification categories based on the probability of video segment matching advertisement classification category. At block 414 an illustrative embodiment further auctions advertising spots defined by a particular video segment classification category, based on advertising classification categories and the current average audience membership available for viewing a particular advertisement at a particular IPTV server or at an end user device.

At block 416 an illustrative embodiment compares probable auction revenue to an end user preference probability for proposed advertising class category. An illustrative embodiment chooses a particular advertisement in an advertising class with the highest preference probability for a particular end user. Another illustrative embodiment chooses a particular advertising class or group of end users with highest probable revenue for a particular group of end users. Thus, if a particular end user has a choice between a clothing advertisement and a car advertisement, the end user preference probability for selecting one of the two advertisements is multiplied by the auction price for each of the advertisements. Thus, if the clothing advertisement auction price is two dollars and the car advertisement was auction price is one dollar, without further consideration, the clothing advertisement would have been presented as available to an end user because the clothing has the highest auction price, two dollars versus one dollar.

However, if the end user's profile indicates that the preference probability for the end user having interest in a clothing advertisement is 20% and the preference probability of the end user responding to a car advertisement is 80% then the probable revenue for the clothing advertisement is $0.40 ($2.00×0.20) where the probable revenue for the car advertisement would be $0.80 ($1.00×0.8). Thus for this particular end user the probable revenue is higher for the lower auction price car advertisement based on the end user preference probability and the car advertisement will be presented to this particular end user. At block 418 an illustrative embodiment presents the selected advertisement data in the classification category during trick play of the video data on an end-user device display. The advertising data sponsoring the trick play of video data is presented on the end user display during play between scenes detected in box 402. The auction price and preference probability can vary depending on what type of device on which the advertising will be made available.

Figure 5:
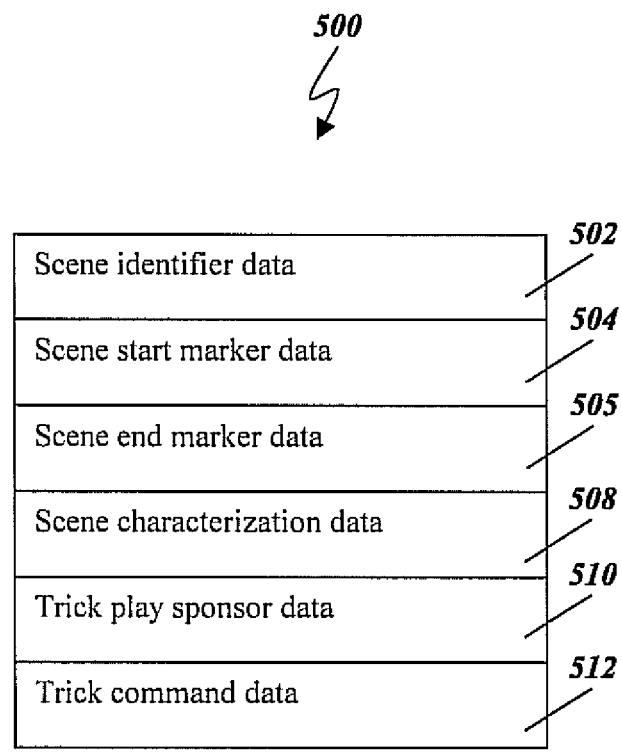
FIG. 5 depicts a data structure embedded in a computer readable medium that is used by a processor and method for presenting advertising data during trick play command execution in another illustrative embodiment.

Turning now to FIG. 5, another illustrative embodiment further includes a data structure 500 associated with the video scene data. As shown in FIG. 5, in a particular illustrative embodiment the data structure 500 includes but is not limited to a first data structure field 502 for containing data indicating scene identifier data. The scene identifier data indicates identifying data which identifies a particular scene detected in the video data stream. In another particular embodiment start marker data. in a particular illustrative embodiment the data structure 500 further includes but is not limited to a second data structure field 504 for containing data indicating scene start marker data for the scene identified in the scene identifier data 502. In another particular illustrative embodiment the data structure 500 includes but is not limited to a third data structure field 506 for containing data indicating scene end marker data for scene identified in the scene identifier data 502. In another particular illustrative embodiment the data structure 500 includes but is not limited to a fourth data structure field 508 for containing data indicating scene characterization data for the scene identified in the scene identifier data 502.

In another particular illustrative embodiment the data structure 500 includes but is not limited to a fifth data structure field 510 for containing data indicating trick play sponsor data for scene identified in the scene identifier data 502. The trick play sponsor data indicates advertising data (video, image and audio) associated with a chosen sponsor or advertiser selected for presentation during execution of trick play command data. In another particular illustrative embodiment the data structure 500 includes but is not limited to a sixth data structure field 512 for containing data indicating trick play command data for execution scene identified in the scene identifier data 502.

Figure 6:
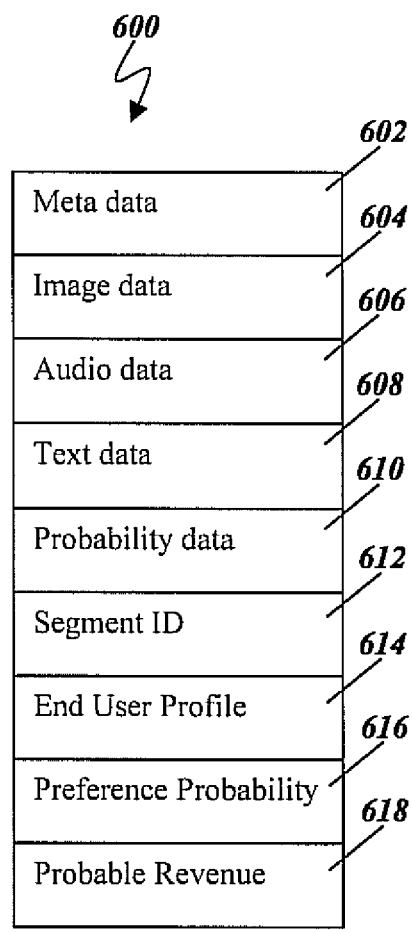
FIG. 6 depicts a data structure embedded in a computer readable medium that is used by a processor and method for presenting advertising data during trick play command execution in another illustrative embodiment.

Turning now to FIG. 6, another illustrative embodiment further includes a data structure 600 associated with the video scene data. Data structure 600 includes a Meta data field 602 for containing Meta data describing particular video scene data. The Meta data can include but is not limited to a description of the video data and characterizing elements from character recognition, pattern recognition, object recognition, speech recognition and text recognition analysis of the video data scene. The video data is single scene or a series of video data scenes bridged together into a common scene and treated as single scene during trick-play command data execution. The data structure further comprises an image data field 604 for containing image data associated with or from a particular video scene. The data structure further comprises an audio data field 606 for containing audio data associated with or from a video scene. The data structure further comprises a text data field 608 for containing text data associated with or from particular video scene. The data structure further comprises a probability data field 610 for containing data indicative of the probability of particular video segment being associated with a particular advertisement data and advertising class. The data structure further comprises an auction data field 612 for containing data indicative of a particular auction value for the particular video segment. An advertising identifier (ID) field 614 is provided to contain data indicating an identifier for the video scene data. The data structure further includes a preference probability field 616 for containing preference probability data indicating an end user's preference probability for selecting an advertisement from a particular advertising class. The data structure further includes a probable revenue field 618 for containing data indicating probable revenue for an end user based on the product of an auction price and preference probability a segment matching an advertisement from a particular advertising class.

Figure 7:
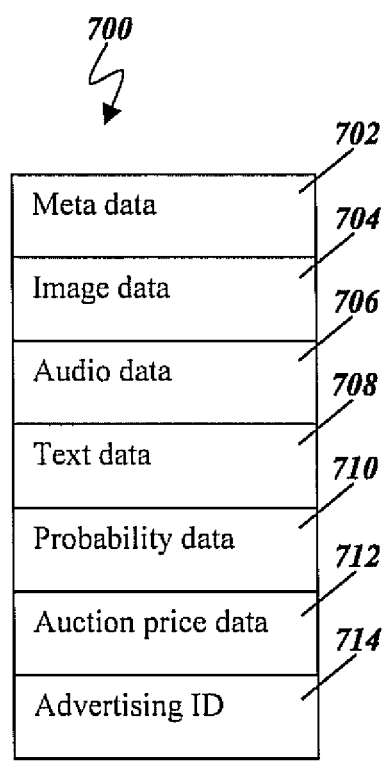
FIG. 7 depicts a data structure embedded in a computer readable medium that is used by a processor and method for presenting advertising data during trick play command execution in another illustrative embodiment.

Turning now to FIG. 7, another illustrative embodiment further includes a data structure 700 associated with the advertising data. Data structure 700 includes a metadata field 702 for containing Meta data describing a particular advertising data. The Meta data can include but is not limited to a description of the advertising data. The data structure further comprises an image data field 704 for containing image data associated with or from a particular advertisement. The data structure further comprises an audio data field 706 for containing audio data associated with or from advertising data. The data structure further comprises a text data field 708 for containing text data associated with or from particular advertisement data. The data structure further comprises a preference probability data field 710 for containing data indicative of the preference probability for particular end user's preference for a particular advertisement data being associated with a particular video scene and advertising class. The data structure further comprises auction data field 712 for containing data indicative of a particular auction value for the particular advertising data. An advertising identifier (ID) field 714 is provided to contain data indicating an identifier for the advertising data.

Figure 8:
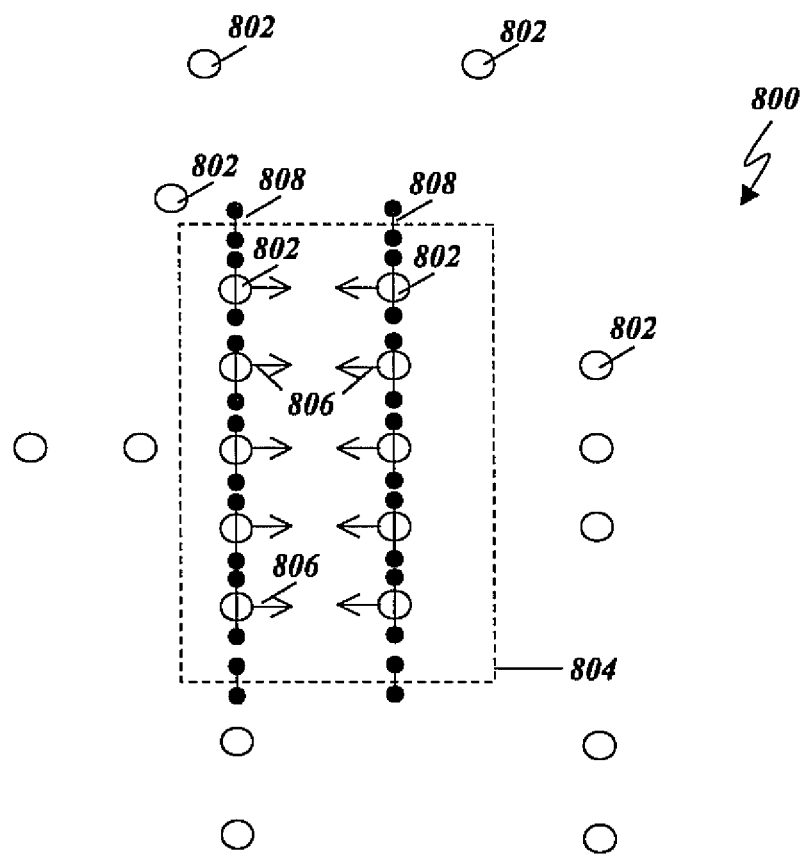
FIGS. 8, 9 and 10 depict sports formation data used in different illustrative embodiments to indicate scene start data in video data.

Turning now the FIG. 8, in a particular illustrative embodiment video data is analyzed with pattern recognition and motion detection software in the processor to detect sports formation data including but not limited to two parallel lines 808 of foot ball players object data 802 within a region 804 on a football field forming two adjacent parallel times 808 indicating a beginning of a football play during a football game (indicating scene start data). Formation maker data are inserted into the video data where the formation data is detected. In another embodiment a motion marker data is inserted into the video data upon detection of motion 806 of the parallel lines 808 of football players object data toward each other after their detection in the formation of the two parallel lines 808. Formation motion data are inserted into the video data where the formation motion data are detected.

Figure 9:
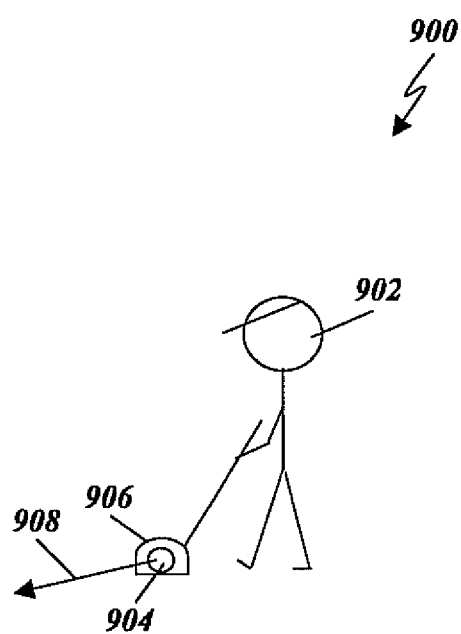

Turning now to FIG. 9, in another embodiment, pattern recognition software in the process is used to detect a scene data in the formation data indicating a stationary golfer 902 addressing a stationary golf ball 904 with a golf club 906. In a particular embodiment the golfer 902 is assumed to address the ball (thus indicating a scene start) when the data indicating the golfer becomes stationary within three feet of stationary golf ball data as indicated by motion detection analysis of the video data. Formation scene marker data are inserted into the video data upon detection of the scene start indicated by the stationary golfer addressing the stationary golf ball. In another embodiment, golf ball data 902 movement 908 is detected in video data using motion detection scene marker data is inserted into the video data at the formation motion marker data are inserted into the video data where the golf ball motion is detected after detecting the golfer addressing the ball.

Figure 10:
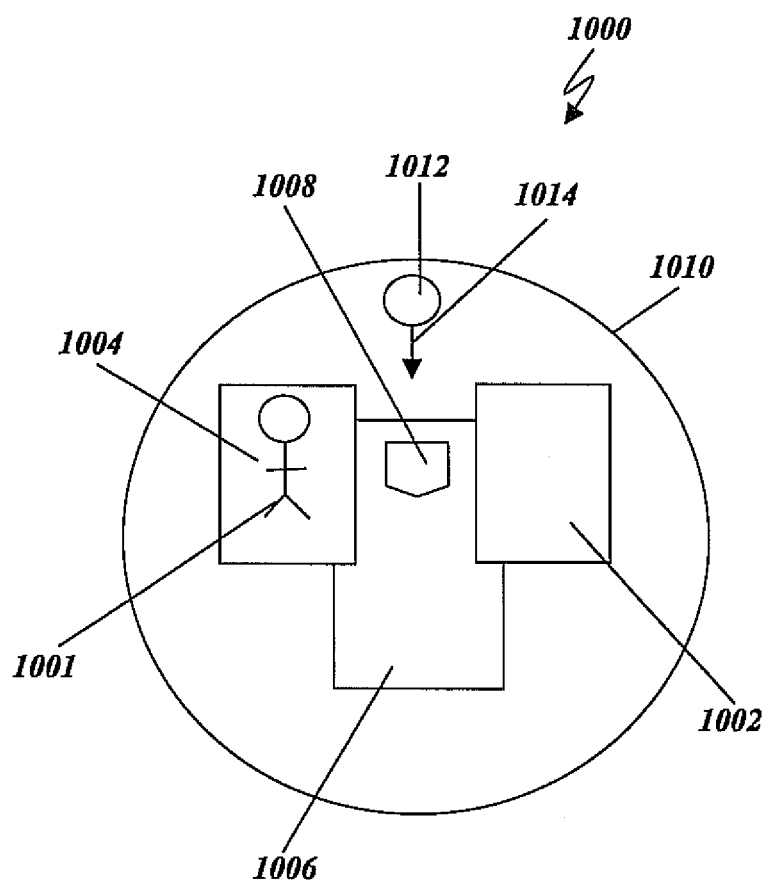

Turning now to FIG. 10, in another embodiment pattern recognition software in the process is used to detect a scene data in the formation data indicating a baseball player 1001 stepping into a batter's box 1004 or 1002 indicating a scene start. In a particular embodiment the baseball player 1001 is assumed to begin an "at bat" (thus indicating a scene start) when the data indicating the baseball play steps into the batters' box 1004 or 1002 as indicated by pattern recognition and motion detection analysis of the video data. Formation scene marker data are inserted into the video data upon detection of the scene start indicated by the batter stepping into the batter's box. In another embodiment, baseball data 1012 movement 1014 is detected in video data using motion detection scene marker data is inserted into the video data at the formation data motion marker data are inserted into the video data where the baseball motion is detected after detecting the batter stepping into the batter's box.

A scene start marker is placed along with formation marker data and also with the formation motion data to be used as a scene start data in two modes, one to mark a formation scene starting point in the video data to present action in the video data before motion of the sports object, for example, a football player, golf ball or baseball and a second mode mark a motion scene starting point in the video data to present action in the video data at the beginning of motion of the sports object. In another embodiment scene end data are placed at the end of each scene indicated by the start of the next scene. In another embodiment scene end data are placed in the video data a selected amount of time after the scene start data are detected. For example, a scene end data marker is placed 25 seconds after the start of a foot ball play and 10 seconds after start of a golf scene. In another embodiment, scene end marker data are placed in the video data upon detection of formation data indicating the end of a scene, including but not limited to a formation such as when a base ball batter leaves the batter's box, a golfer walks from the stationary position after the golf ball motion is detected or a football comes to rest after football scene formation motion data are detected.

Figure 11:
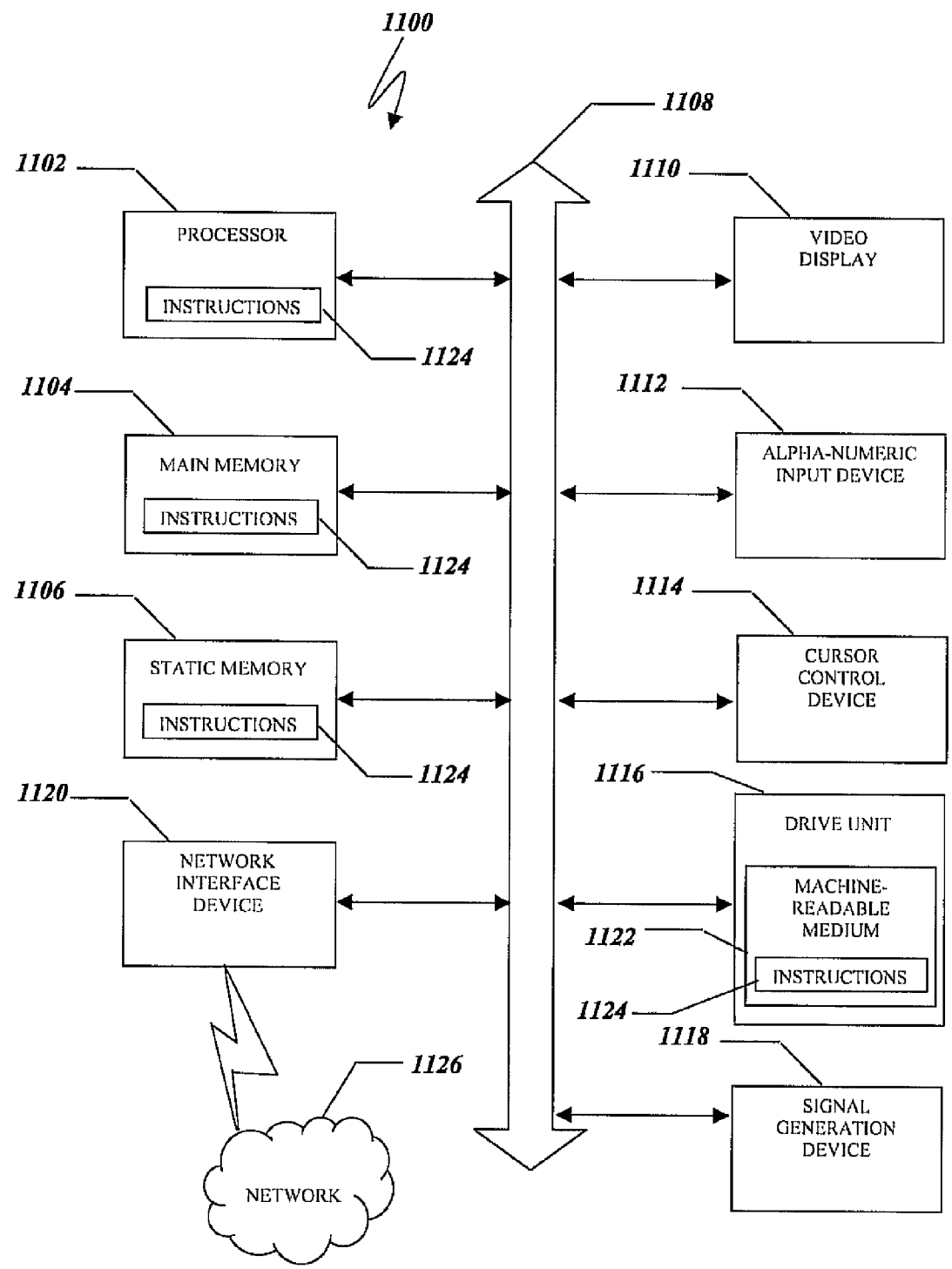
FIG. 11 depicts an illustrative embodiment of a machine for performing functions disclosed in another illustrative embodiment.

FIG. 11 is a diagrammatic representation of a machine in the form of a computer system 1100 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., liquid crystals display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface.

The disk drive unit 1116 may include a machine-readable medium 1122 on which is stored one or more sets of instructions (e.g., software 1124) embodying any one or more of the methodologies or functions described herein, including those methods illustrated in herein above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present invention contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120. The machine readable medium may also contain a data structure for containing data useful in providing a functional relationship between the data and a machine or computer in an illustrative embodiment of the disclosed system and method.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 38 C.F.R. §1.82(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, computer readable medium, containing a computer program comprising instructions that when executed by a computer perform functions to place a scene marker in a video data stream advertising data, the computer program comprising:
    instructions to receive the video data stream at a central office server;
    instructions to analyze the video data stream at the central office server using pattern recognition and motion detection software;
    instructions to identify at the central office server a plurality of separate objects in the video data stream as players in a sport;
    instructions to insert at an insertion device, a scene start marker into the video data stream at a scene start marker position, wherein the scene start mark position is recognized at the central office server as a scene start marker position in the video data stream indicated by recognizing on the server that two parallel lines are formed by the plurality of separate objects;
    instructions to insert a motion start marker into the video data stream at a motion start marker position indicated by recognizing on the server that the two parallel lines are of football players are in motion toward each other;
    instructions to present trick play sponsor data during a move to the scene start marker in the video data stream;
    instructions to insert scene end data marker in the video data stream at a scene end position indicated by determining that a football object in video data stream has stopped motion after the start motion position in the video data stream; and
    instructions to, at the central office server to move to the scene start marker in the video data stream in response to receiving end user trick play command data.

2. The non-transitory, computer readable medium of claim 1, wherein the scene start marker indicates a start of a sports scene based on a geometric relationship between the separate objects, the computer program further comprising:
    instructions to generate scene characterization data for the video data stream between the scene start marker at start of the sports scene and the scene end marker in the video data stream; and
    instructions to select a trick play sponsor from a correlation between the scene characterization data and the trick play sponsor data.

3. The non-transitory, computer readable medium of claim 1, wherein the trick play sponsor data further comprises visual presentation data.

4. The non-transitory, computer readable medium of claim 1, wherein the trick play sponsor data further comprises audio presentation data.

5. The non-transitory, computer readable medium of claim 1, wherein a geometric relationship between the plurality of separate objects indicates a baseball batter in a batter's box.

6. The non-transitory, computer readable medium of claim 1, the computer program further comprising instructions to insert scene end data marker in the video data stream a predetermined time later in the video data stream after the scene start marker of a sports scene based on a geometric relationship between the plurality of separate objects including a baseball batter in a batter's box.

7. The non-transitory, computer readable medium of claim 6, wherein the predetermined time later for the scene end data marker is 10 seconds for a golfer addressing a golf ball, 15 seconds for a baseball player in a batter's box, and 25 seconds for the motion of the two parallel lines of football players.

8. A system for presenting advertising data, the system comprising:
    a processor in data communication with a tangible computer readable medium; and
    a computer program embedded in the computer readable medium, the computer program comprising:
    instructions to analyze a video data stream at a central office server using pattern recognition and motion detection software;
    instructions to identify at the central office server a plurality of separate objects in the video data stream as players in a sport;
    instructions to insert at an insertion device, a scene start marker into the video data stream at a scene start marker position, wherein the scene start mark position is recognized at the central office server as a scene start marker position in the video data stream indicated by indicated by recognizing on the server that a golfer is approaching a golf ball;
    instructions to insert a motion start marker into the video data stream at a motion start marker position indicated by recognizing on the central office server that golf ball is moving;
    instructions to present trick play sponsor data during a move to the scene start marker in the video data stream; and
    instructions to insert scene end data marker in the video data stream at a scene end position indicated by determining that golf ball has stopped motion after the start motion position in the video data stream; and instructions to, at the central office server, move to the scene start marker in the video data stream in response to receipt of end user trick play command data at the central office server.

9. The system of claim 8, wherein the scene start marker indicates a start of a sports scene based on a geometric relationship between the separate objects, the computer program further comprising:
   instructions to generate scene characterization data for the video data stream between the scene start marker at start of a sports scene and the end scene marker an end of the sports scene; and
   instructions to select a trick play sponsor from a correlation between the scene characterization data and the trick play sponsor data.

10. The system of claim 8, wherein the trick play sponsor data further comprises visual presentation data.

11. The system of claim 8, wherein the trick play sponsor data further comprises audio presentation data.

12. The system of claim 8, wherein a geometric relationship between the plurality of separate objects indicates a baseball batter in a batter's box.

13. The system of claim 12, wherein the instructions to recognize further comprise instructions to sense movement at a second particular point in the video data stream in the plurality of separate objects at the start of a sports scene indicating a start of a sports play in progress and the instructions to move further comprise instructions to the move to the second particular point in the video data stream indicating the start of the sports play in progress.

14. The system of claim 13, wherein the separate objects include a golf ball, and wherein the computer program further comprises instructions to insert a scene end data marker into the video data stream a predetermined time later in the video data stream after a start of the sports scene indicated by recognizing on the central office server a golfer addressing a golf ball.

15. A tangible non-transitory computer readable medium containing a data structure embedded in the computer readable medium for containing a computer program used by a computer to present advertising data, the computer program comprising:
   instructions to insert at an insertion device, a scene start marker into a video data stream at a scene start marker position, wherein the scene start mark position is recognized at a central office server as a scene start marker position in the video data stream indicated by recognizing on the server in the video data stream at the scene marker position that a batter is in a batter's box;
   instructions to insert a motion start marker into the video data stream at a motion start marker position indicated by recognizing on batter is moving out of the batter's box;
   instructions to present trick play sponsor data during a move to the scene start marker in the video data stream; and
   instructions to insert scene end data marker in the video data stream at a scene end position indicated by determining that a football object in video data stream has stopped motion after the start motion position in the video data stream.

* * * * *